United States Patent Office 3,238,252
Patented Mar. 1, 1966

3,238,252
PURIFICATION OF FERMENTATION BROTHS
Tullio Giacometti, La Tour-de-Peilz, Switzerland, assignor to Maggi-Unternehmungen A.G., Kempttal, Canton of Zurich, Switzerland, a corporation of Switzerland
No Drawing. Filed Aug. 6, 1963, Ser. No. 300,176
Claims priority, application Switzerland, Aug. 22, 1962, 9,988/62; Mar. 13, 1963, 3,167/63; Apr. 17, 1963, 4,794/63
11 Claims. (Cl. 260—527)

This invention is concerned with improvements in or relating to the purification of fermentation broths, to remove cell materials and other impurities therefrom.

In the production of organic substances by fermentation methods one generally arrives, at the end of the fermentation, at a so-called fermentation broth which contains, apart from the end products, various solid or semi-solid materials, such as bacterial cells of the microorganism(s) used for the fermentation, residual starting materials and other incidental impurities, in aqueous solution or suspension. The product of the fermentation usually remains in solution and, once the solid or semi-solid substances have been removed, may be recovered by conventional methods such as crystallisation, extraction, precipitation and the like.

On an industrial scale, serious difficulties are encountered with the removal of the cell materials present in fermentation broths, since they are not easy to filter off or centrifuge. Furthermore, they have an inhibiting effect on crystallisation, and, if an ion-exchange treatment is attempted, the cell materials tend to block the resin.

It has now been found that the removal of cell materials from fermentation broths may be considerably simplified by treating the broth with calcium hydroxide, converting the calcium hydroxide to calcium carbonate and removing the precipitated calcium carbonate together with the cell materials which are precipitated at the same time.

The present invention accordingly provides a process for the purification of a fermentation broth to remove cell materials and other impurities therefrom which comprises treating the fermentation broth with calcium hydroxide, converting the calcium hydroxide in the broth into calcium carbonate and separating the calcium carbonate from the broth together with the coprecipitated cell materials and other impurities.

A so-called lime-purification is used in the sugar industry for the purification of sugar juices, but it is most surprising that an analogous process can be successfully applied to the removal of living or freshly killed cells of microorganisms from a fermentation broth.

Although we do not wish to be limited by theoretical considerations, the following sequence of reactions appears to take place during the process. Firstly, the calcium hydroxide reacts with the cell walls causing a denaturation of the proteins of which the cells are principally composed. The cells shrivel up and, at the same time, acquire a negative charge. The nascent calcium carbonate, which is formed by the conversion of the calcium hydroxide, has a positive charge and adsorbs the negatively-charged cell materials, together with any other impurities, such as colouring matters, which may be present. Since calcium carbonate is insoluble in water, it precipitates out, together with the cell materials and impurities and both may be easily separated from the broth, thus obtaining a solution of the fermentation product. The separation of the precipitate may be effected by filteration, centrifuging, decanting or any other convenient method.

According to one preferred method of carrying out the process according to the invention, dissolved lime, for example in the form of milk of lime, is added to the fermentation broth to be treated, in an amount which corresponds to a calcium content, in the broth, of 0.1 to 10% by weight, preferably about 5%, calculated as the oxide. The mixture is preferably left to react for a short time, e.g., about 5 to 40 minutes, preferably 10 to 20 minutes, before the conversion of the calcium hydroxide into calcium carbonate.

If desired, the calcium hydroxide may be formed in situ in the fermentation broth, for example by adding finely powdered calcium oxide (lime) to the broth.

Preferably, the treatment with calcium hydroxide is effected at an elevated temperature, for example at 70 to 90° C. When ground lime is added, it is generally unnecessary to heat the broth since the heat of hydration which is liberated is, in most cases, sufficient to raise the temperature to the desired level.

It has been found that the rate of filtration of the fermentation broth may be substantially increased if, before the conversion of the calcium hydroxide into calcium carbonate, the broth is held for 5 to 40 minutes, preferably 10 to 20 minutes, at a temperature of 70 to 90° C., preferably at 75 to 85° C.

The conversion of the calcium hydroxide into calcium carbonate may be effected by introducing carbonate ions into the broth. This is conveniently achieved by passing in carbon dioxide until a pH of about 7.5 is reached. Alternatively, one may add an appropriate quantity of an alkali metal carbonate, particularly sodium carbonate.

In a further preferred method of carrying out the process according to the invention, the conversion of the calcium hydroxide into calcium carbonate is effected in two stages at different pH-values with an intermediate separation of the precipitated substances. In the first stage, for example, the pH may be lowered to about 9.4 to 9.5, preferably by passing in carbon dioxide and the broth may then be filtered. The filtered solution may then again be treated with carbon dioxide until a pH of about 7.7 is reached, and the broth filtered again.

As indicated previously, the broth is preferably maintained at a temperature of 70 to 90° C., preferably 75 to 85° C., for about 5 to 40 minutes, preferably 10 to 20 minutes, before the conversion of the calcium hydroxide into calcium carbonate, when the conversion is effected in two stages.

If the precipitated substances are removed from the broth by filtration, it is preferred to effect the filtration at about 50 to 60° C., or alternatively at ambient temperature.

By applying the process according to the invention it is possible to arrive at a fermentation solution which is substantially completely free from cell materials and other colloidal substances, and from which a fermentation product of high purity may be recovered in simple manner.

The process according to the invention is particularly suitable for the removal of cell substances from fermentation broths resulting from the fermentative production of glutamic acid (L-glutamic acid) in media which may optionally contain biotin. However, its application is not restricted to such broths and it may advantageously be used for the removal of microorganism cells from fermentation broths resulting from other fermentation processes, for example in the fermentative production of other amino acids, such as alanine, aspartic acid, ornithine, lysine, valine, threonine, homoserine, isoleucine, diaminopimelic acid or of their salts or betaines; of antibiotics, such as penicillin, aureomycin, streptomycin, mitomycin; of nucleotides, such as inosinic acid (inosine-5'-monophosphate), xanthosine; or of other organic substances, such as citric acid, allo-isocitric acid, itaconic acid, malic acid, orotic acid, 5-ketofructose.

The following examples, in which parts and percentages are by weight, are given for the purposes of illustration only:

*Example 1*

100 parts of a fermentation broth containing 16% dry solids, including 5% glutamic acid and 3% bacterial cells, are heated to 80° C. 10 parts of milk of lime, containing 40% calcium hydroxide, are then added during 20 minutes with vigorous stirring. After a reaction time of 10 minutes, carbon dioxide is passed into the broth with vigorous stirring until the pH reaches 7.5. After 15 minutes' reaction time the precipitated calcium carbonate is filtered off together with the coprecipitated bacterial cells, to yield a clear filtrate. Glutamic acid may be recovered from the filtrate by conventional methods, for example by precipitation at the isoelectric point (pH 3.2).

*Example 2*

10 parts of finely ground calcium oxide were added to 100 parts of a fermentation broth containing 10% dry solids, including 2.5% betaine and 2.5% cell materials. The temperature of the broth rose from 20° C. to 90° C. on account of the heat of reaction liberated during the conversion of calcium oxide into calcium carbonate. After 30 minutes, 19 parts of sodium carbonate were added, and allowed to react for 20 minutes. The precipitated calcium carbonate was then filtered off, together with the coprecipitated cell materials, yielding a clear solution from which the betaine may be isolated as desired, for example, by means of an ion exchanger.

*Example 3*

3.5 parts of lime were added to 100 parts of a fermentation broth containing 5.5 parts glutamic acid together with bacterial cells. The original pH of the broth was 12.2 to 12.4. The broth was heated to 75–85° C. and maintained at this temperature, with vigorous stirring, for 10 to 20 minutes.

The pH of the broth was then adjusted to 9.4 to 9.5 by passing in carbon dioxide, and the temperature lowered to 50–60° C. The broth was then filtered at this temperature without difficulty.

Carbon dioxide was again passed into the filtrate until a pH of 7.7 was reached and the broth was filtered again, yielding a clear solution.

Glutamic acid was crystallised from the solution in two crystal crops. Purity of first crop: 95%, second 90%. Yield 75 to 80%.

I claim:

1. In the recovery of a compound which exists as such in a fermentation broth and which is non-reactive with calcium hydroxide, which fermentation broth in addition to said compound includes cell materials and other impurities, the improvement which comprises removing said cell materials and other impurities from the said fermentation broth without substantial loss of said compound by subjecting the fermentation broth to the action of calcium hydroxide in a sufficient amount and for a sufficient time to denature the cell walls of said cell material, and introducing carbonate ions into the thus treated fermentation broth so as to convert said calcium hydroxide to calcium carbonate which precipitates and carries with it the cell materials and other impurities while leaving said compound substantially unchanged in the remaining fermentation broth.

2. Method according to claim 1, in which the amount of calcium hydroxide in said fermentation broth is between about 0.1 to 10% by weight calculated as calcium oxide.

3. Method according to claim 2, in which the fermentation broth is subjected to reaction of the calcium hydroxide at a temperature of about 70°–90° C.

4. Method according to claim 1, in which said compound is an amino acid.

5. Method according to claim 1, in which said compound is glutamic acid.

6. Method according to claim 1, in which carbon dioxide is introduced into the fermentation broth in order to convert the calcium hydroxide to calcium carbonate.

7. Method according to claim 1, in which the calcium hydroxide is converted to calcium carbonate by the addition to the fermentation broth of a substantially stoichiometric quantity of an alkali metal carbonate.

8. Method according to claim 1, in which the calcium hydroxide to which the fermentation broth is subjected is formed in situ in the fermentation broth by the addition of calcium oxide thereto.

9. Method according to claim 1, in which the amount of calcium hydroxide in the fermentation broth is between about 0.1 and 10% by weight, calculated as calcium oxide, in which the temperature at which the fermentation broth is subjected to the calcium hydroxide is between about 70° and 90° C., and in which the time of action of the calcium hydroxide on the fermentation broth is between about 5 and 40 minutes.

10. Method according to claim 1, in which the conversion of the calcium hydroxide into calcium carbonate is effected in two stages at different pH values, the precipitated substances being removed from the fermentation broth after each stage.

11. Method according to claim 10, in which the pH of the broth is adjusted to about 9.4 to 9.5 in the first stage, and to about 7.7 in the second stage.

References Cited by the Examiner

UNITED STATES PATENTS

| | | | |
|---|---|---|---|
| 2,796,434 | 6/1957 | Fike | 260—527 |
| 2,842,592 | 7/1958 | Holgan | 260—527 |
| 2,933,524 | 4/1960 | Holgan | 260—527 |
| 3,087,863 | 4/1963 | Lee et al. | 195—47 |

A. LOUIS MONACELL, *Primary Examiner.*

L. M. SHAPIRO, *Assistant Examiner.*